United States Patent [19]

Cooper et al.

[11] Patent Number: 4,627,054

[45] Date of Patent: Dec. 2, 1986

[54] MULTIPROCESSOR ARRAY ERROR DETECTION AND RECOVERY APPARATUS

[75] Inventors: Ronald J. Cooper, Raleigh; Mario A. Marsico, Cary; John C. Pescatore, Durham, all of N.C.

[73] Assignee: International Business Machines Corporation, Armonk, N.Y.

[21] Appl. No.: 644,888

[22] Filed: Aug. 27, 1984

[51] Int. Cl.[4] .............................................. G06F 11/00
[52] U.S. Cl. ......................................... 371/11; 371/16
[58] Field of Search ..................... 371/11, 9, 16, 18; 364/200, 900

[56] References Cited

U.S. PATENT DOCUMENTS

| | | | |
|---|---|---|---|
| 4,347,563 | 8/1982 | Paresdes | 371/11 |
| 4,371,952 | 2/1983 | Schuck | 371/16 |
| 4,392,199 | 7/1983 | Schmitter | 371/11 |
| 4,395,755 | 7/1983 | Wakai | 371/18 |
| 4,453,213 | 6/1984 | Romagosa | 371/16 |

*Primary Examiner*—Michael R. Fleming
*Attorney, Agent, or Firm*—Edward H. Duffield

[57] ABSTRACT

A multiprocessor array is described in which a central controlling microprocessor interfaces over commonly connected address and data busses to a plurality of peripheral microprocessors. A memory mapped I/O interface controls access to and from the busses for mutual receipt and exchange of signals between the processors and mutual exchange and receipt of data among the processors. The individual processors are selectively isolatable by a plurality of three state switch means connected between each processor and the interconnecting data and address busses. Error detection and control logic is connected via control lines to the individual processors and responsive to an error indication thereof, activates a multipoint error signal to all said microprocessors over a control line, which signal is interpreted by the processor then controlling said busses as a signal to deactivate its operation and as a signal at said control microprocessor to invoke an interrupt for analyzing the causes of said error. The control microprocessor can issue memory mapped I/O instructions to the individual three state selective isolation means and/or to any of the I/O microprocessors to respectively isolate the processors from said busses or to control said processors in an error analysis routine. The apparatus further includes a machine check register and a bus master register associated with said control microprocessor which registers can be written in by said control microprocessor and read from only by one of said I/O microprocessors.

5 Claims, 12 Drawing Figures

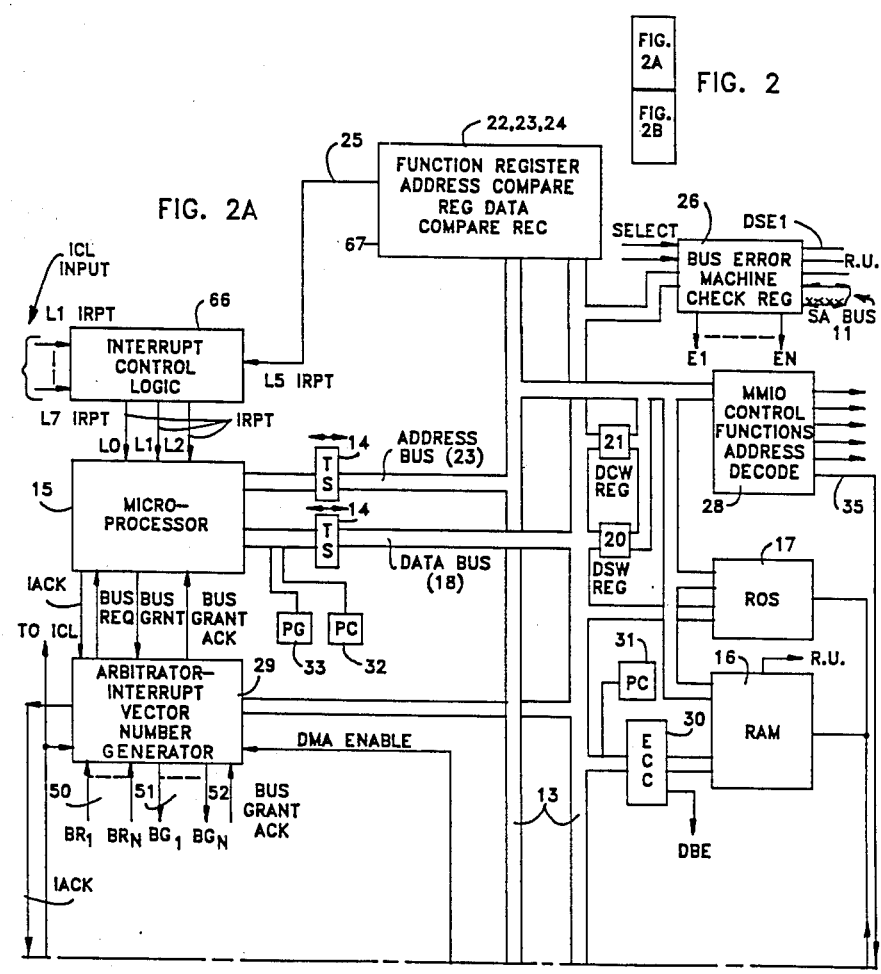

MULTIPROCESSOR ARRAY ERROR DETECTION AND RECOVERY APPARATUS

RELATED APPLICATIONS

This application is closely related to the co-pending simultaneously filed applications Ser. Nos. 644,882 and 644,889 dealing with specific features of the arbitrator and of the architecture and data flow arrangements in this multiprocessor system.

BACKGROUND

1. Field of the Invention

This invention relates to multiprocessor arrays and to means therein for isolating the source of errors, analyzing and recovering therefrom and for controlling access to the interconnecting data and address busses thereby.

2. Prior Art

A number of prior art diagnostic routines and architectures exist for multiprocessor arrays. These, however, commonly rely upon a routine run by a central or controlling processor which analyzes signal lines and status registers in each of the interfacing other processors to locate the source of error. While this is effective, it is very time consuming on the main control processor and does not provide a means of recovery when one of the interfacing processors gets hung up or enters a streaming condition in which it does not respond to commands from a controlling processor.

OBJECTS OF THE INVENTION

In view of the foregoing shortcomings with the known prior art, it is an object of this invention to provide an improved multiprocessor error detection, isolation and recovery means in a multiprocessor array.

BRIEF DESCRIPTION OF THE DRAWINGS

FIGS. 2A and 2B illustrates a more detailed schematic of the data flow and design architecture of the machine and show some of the more important control lines and data paths as well as the chief functional elements and control registers utilized in the architecture. FIGS. 2A and 2B taken together constitute FIG. 2 as shown in the small diagram in the upper right hand portion of FIG. 2A.

SUMMARY

Figure 1:
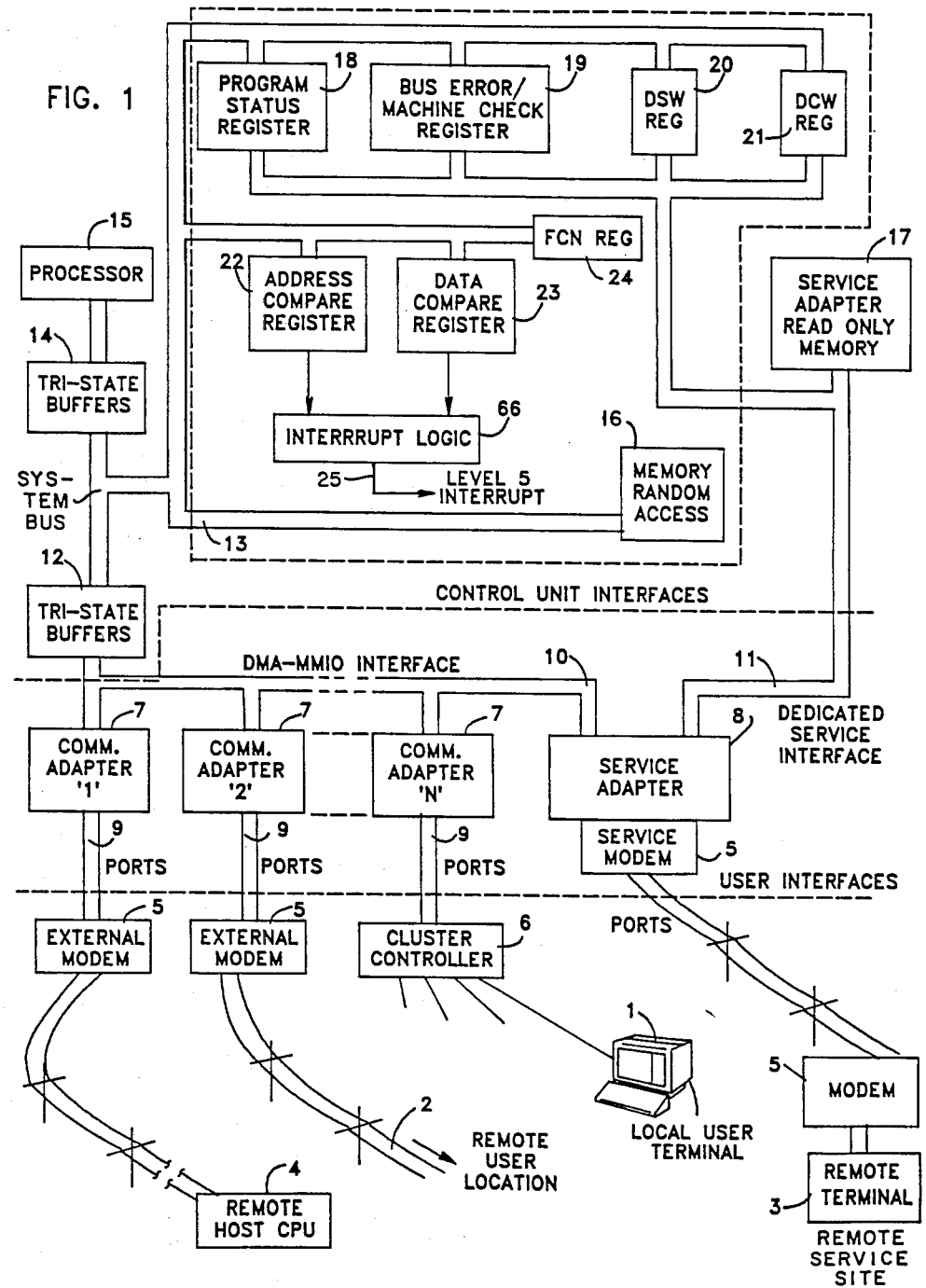
FIG. 1 illustrates the general high level data flow schematic for the multiprocessor arrangement constituting a scannerless message concentrator and communications multiplexer in accordance with the present invention.

The foregoing and still other objects not specifically enumerated are met in the preferred embodiment by providing a common set of bus grant/interrupt grant enabling lines connected from a priority arbitrating apparatus to the individual requesting units. Interrupt requests from the units are dot ORed together and presented on a single common line to a controlling microprocessor which must service the interrupt. The microprocessor will determine when the interrupt is to be granted and will signal the arbitration means which will arbitrate among the competing requestors on a priority basis to select the requestor to which the eventual interrupt grant can be directed over a grant indicating line connected specifically to the requestor. The requestors will know whether a bus access or an interrupt service request is being acknowledged by the presence of the interrupt acknowledge signal coming from the controlling microprocessor. The specific requestor which has been granted bus access or an interrupt will be notified by the signal line from the arbitration device connected to it. Since only a single grant enabling line is connected to each requesting device from the arbitration device and the grant signal lines have the dual purpose of indicating either the bus access grant or an interrupt service grant, the total number of interconnections is greatly reduced and the cost is likewise reduced. The usage of an arbitration device for handling competing requests off-loads a great deal of housekeeping chores from the microprocessor. The microprocessor then needs to concern itself only with the timing of the appropriate grant of an interrupt request or a bus access request. As a further simplification of operation, in the DMA mode, the arbitration circuit contains a register for storing the identification of the successfully competing requestor. The register also holds an indication of the type of request sought. Logic in interrupt mode gates these signals as a vector for vectored interrupt number generation. These signals are utilized to identify to the controlling microprocessor the location in main memory where it should fetch instructions for servicing a given interrupt. This also greatly simplifies the task of the microprocessor and greatly reduces the cost and complexity of the overall system while enhancing throughput capability by reducing involvement of the microprocessor still further.

For error detection and control in the multiprocessor array described, a central controlling microprocessor interfaces a plurality of peripheral I/O microprocessors over commonly connected address and data busses. The individual I/O processors are selectively isolated from the data and address busses under memory mapped I/O control instructions driven by the controlling microprocessor. Tristate switches connect each I/O processor to the interconnecting data and address busses on both its input and output side. The error detection and control logic monitors the overall activity on the data and address busses to detect errors from any of the processors and is connnected via individual control lines to the individual processors to respond to an error indication therein. Any error discovered by the error control logic leads to the activation of a multi-point error signal to all the microprocessors. This signal will be interpreted by the processor then controlling the busses as a signal to discontinue operation and invoke at the controlling microprocessor by means of an interrupt generated by the specific I/O microprocessor found to be in error interrupt to cause the controlling microprocessor to analyze for the causes of the error. The controlling microprocessor can then issue MMIO instructions to the tristate isolation switches on the busses to and from the specific microprocessor to isolate it for further analysis and/or to control the processors together in an error analysis routine.

DETAILED SPECIFICATION

The preferred embodiment of the invention will now be described with reference to the drawings. For convenience, major functional elements and features of the elements will be separately described under individual headings in this specification. General familiarity with interrupt driven processors and in particular with 16-bit wide processors such as the Motorola 68000 is assumed and while the preferred embodiment utilizes such processors specifically, the basic techniques and generic invention are not limited to the specific processor. Therefore, detailed flow charts and machine code listings are not given herein since they are not necessary to an understanding of the invention claimed. Such listings deal only with the operation of a given specific processor and can be easily programmed by one of ordinary skill given an understanding of the function to be performed and the instruction set for a given processor.

Although the several figures of the drawing are drawn somewhat differently, wherever they incorporate the same element or elements, the same numbering is used as in other figures for the same elements even though they may be depicted in different figures in a slightly different manner.

Turning to FIG. 1, the overall high level data flow and architecture of a preferred embodiment of the present invention is shown. At the outset, it may be observed that all of the devices below the dotted line labeled "User Interfaces" are the usual communications facilities including modems, transmission lines, terminals, cluster controllers and host CPUs. All of these devices operating at different speeds, protocols and data formats are interfaced to the communication ports of communication adapters of the preferred embodiment of the invention. Messages destined to or from a host CPU will be queued in the main memory shown in the dotted box 16 which includes a variety of internal register spaces, some of which have been specifically called out and separately shown in FIG. 1. Messages queued in main memory are directly loaded via DMA access controlled by the individual communication adapters each of which comprises a microprocessor of the same type as the central control processor and each adapter is given the task of formatting or deformatting messages in accordance with the desired speed, format and protocol for the given communication port and user to which it is attached. Exchanges of data with main memory are therefore exchanges of pure data without frame characters, sync characters and the like. This facilitates communication between the plurality of users, all of whom may communicate using different formats and protocols in a transparent manner insofar as the user is concerned since the individual communications adapters to which the user interfaces will handle the sometimes complex tasks of conversion as necessary among the protocols and formats to enable communication to occur.

In FIG. 1, a local user terminal 1 is illustrated as but one of a number of possible devices that may be connected, sometimes via a cluster controller 6 to communication ports 9 of a communication adapter 7 which is housed in a communications controller, message concentrator and multiplexer which will handle incoming messages from users or messages from a host CPU 4 destined to the users. Where telephone lines are required for longer distance communication, the usual interface modems 5 are employed as shown. A service adapter 8 is a communications adapter in normal mode of operation and is interfaced to the DMA/MMIO interface 10 which comprises the system data and address busses and control lines that each of the other adapters 7 also utilizes. However, a dedicated service interface 11 comprising a dedicated service bus and address bus are available to the service adapter 8 by command received over the integrated service modem 5 connected to a remote terminal 3 over a communication line and remote modem as shown. The dedicated service interface 11 has its own dedicated service adapter read only memory that contains control and diagnostic routines that may be accessed from the remote terminal 3 for exercising the elements of the overall machine to uncover the source of errors. Access to the program status register 18 and to the bus error/machine check register 19 are specifically available over the dedicated service interface even though the main processor 15 may be disabled or inoperative.

The flow of data is from a user device 1, into a communications adapter 7 and over the DMA/MMIO interface 10 through tri-state driver/receivers 12 onto the system bus 13 and into main memory 16. The other registers 18 through 23 are also part of the random access memory but have been broken out and shown separately. Therefore, all of the FIG. 1 which is within the dotted line portion is actually a part of the random access memory 16.

Tri-state driver/receivers also isolate the interface to the main processor 15 and, while not specifically shown, other tri-states also are utilized to isolate the communications adapter interfaces at the adapters 7 where the interface the DMA/MMIO facility.

The basic machine depicted in FIG. 1 is capable of supporting up to 16 communication line adapters 7 and each communication line adapter supports either 1 or 2 ports 9. Although not shown in the figure, the base machine also contains a diskette adapter and drive for storing control programs for the main processor as is customary in many microprocessor based system designs. This diskette adapter and drive are interfaced over the same type of DMA/MMIO interface 10 as the other communications adapters 7 but as this aspect is not necessary to an understanding of the present invention, for simplicity it is not shown specifically.

The control processor 15 in the preferred embodiment may be the type MC68000 offered by the Motorola Company. This is an 8 megahertz clock based processor that provides a 16-bit bidirectional data bus and a 23-bit address bus incorporating both upper data strobe and lower data strobe. This gives a memory addressing range of 16 megabytes. As employed in the preferred embodiment, the Motorola MC68000 provides eight 32-bit data registers, seven 32-bit address registers, a user stack pointer, a supervisory stack pointer, a 32-bit program counter and a 16-bit status register. Data registers are used for 8-bit byte, 16-bit word and 32-bit long word data operations. The address registers and system stack pointer may be used as software stack pointers and base address registers as described in the vendor's product literature. In addition, the registers may be used for word and long word address operations. All of the registers may be used as index registers.

The MC68000 is an interrupt driven processor as will be understood by those of skill in the field. The various interrupt levels and their interaction will be described later. First, turning to FIG. 2, a somewhat more detailed understanding of the overall data flow and control architecture must be gained.

Figure 2B:
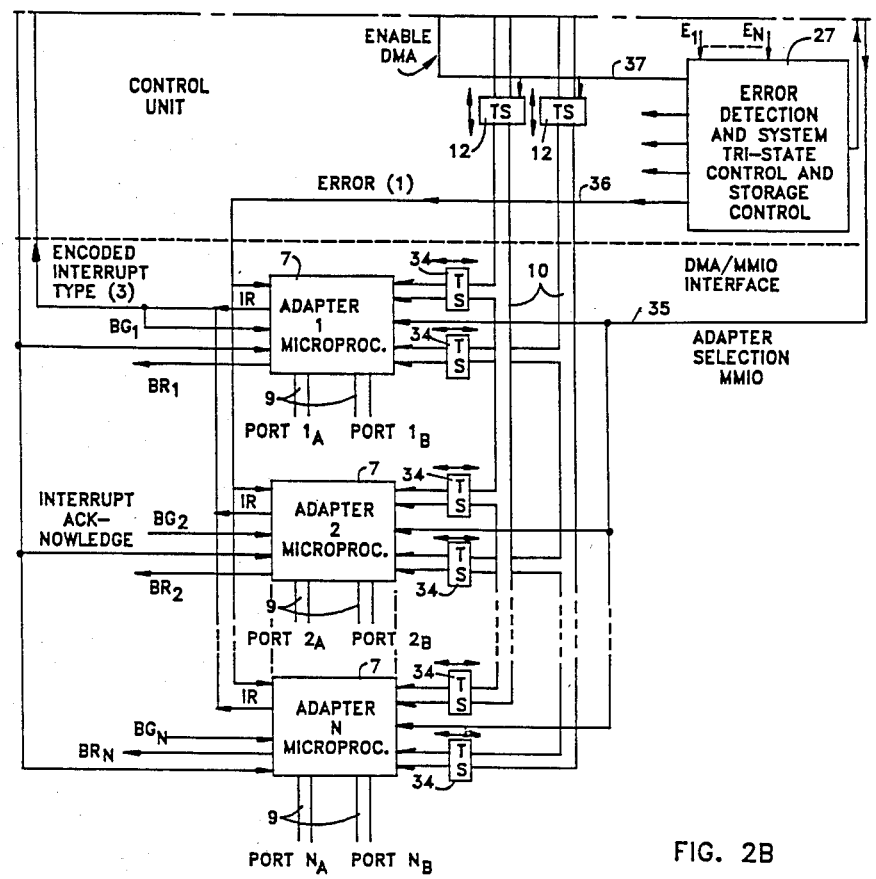

In FIG. 2, the dotted line separates all of the elements which are at the DMA/MMIO interface. Those elements below the dotted line are the adapters, the tristate drivers and receivers that isolate the adapters and all of the communication ports. It will be observed that the adapters are depicted as being identical and are only numbered to distinguish between them. Each adapter is capable of interfacing to one or two ports 9 and some of the adapters are given dedicated functions such as being a diskette adapter, or the adapter which houses the service interface which is not shown in FIG. 2. Flow of data from ports 9 to an individual adapter 7 and from thence to the tri-state driver receivers 34 onto the MMIO interface busses 10 is further isolated by tri-state drivers 12 from the main system data and address bus 13 as shown. Each individual adapter 7 will generate either a bus request or an interrupt request as it requires interrupt service or DMA access to the main memory. These requests are presented to the arbitrator and interrupt vector number generator 29 over bus request lines 50, or a common interrupt line designated IR. This line connects to the microprocessor interrupt control logic ICL.

Incoming data from a user will be stripped of framing and formatting characters and converted to the transistor logic level in each adapter 7. The adapter will transfer data directly via DMA over the data bus into random access memory 16 at a location set up by the individual adapter processor once it has been granted access to the bus by the arbitrator 29.

Where service to an adapter microprocessor in an adapter 7 is required, the interrupt request will be arbitrated by the arbitrator 29 from among any other competing interrupt requests and when the highest priority adapter, identified by its physical position in the architecture is selected from among those requesting service, the arbitrator will generate an interrupt vector number to give the starting address in memory where the main processor 15 can fetch instructions for servicing the specific type of interrupt presented by an adapter 7.

A variety of machine control, MMIO control functions and decoders, interrupt control logic and bus error and machine check and logic and error controls are shown and will be described in greater detail as follows.

Control Unit Interrupt Levels

In the system shown, the control unit is advantageously a 68000 type microprocessor sold by the Motorola Company. As used in the present invention, this machine has 8 levels of interrupts and, effectively, a 9th overall interrupt level (highest priority) exception condition. These levels and conditions are defined for purposes of the present invention as follows.

Bus error level—this is the overall error level exception which is activated by the control logic 27 when an error is detected and the control processor is in control of the bus. This error will disenable the DMA/MMIO interface until bus error machine check register 26 is reset and until the external bus tri-state drivers 12 are enabled again. The control unit interrupt control logic 66 will prevent any interrupts from being serviced after a bus error has occurred. It contains an interrupt inhibit latch that must be reset before interrupts may be allowed again to be presented.

Interrupt level 7—this is assigned a disk dump and testing function not pertinent to the present discussion.

Interrupt level 6—adapters present control interrupts on this level and result in vector numbers being generated by the control unit vector number generator housed in the arbitrator 29. A control interrupt is one of three classes of interrupts that can be generated by an adapter, the other two being operational interrupt and adapter machine check. These latter two classes of interrupt are presented on interrupt level 1 as will be described later. These interrupts are reset by the adapter whose interrupt is being acknowledged by the interrupt grant signal which will be described in the section on the DMA interface.

The other interrupt on level 6 is an interrupt from a service adapter which is one of the adapters 7 dedicated to the service function when it is in service mode.

Interrupt level 5—this is a control unit address detection interrupt which notifies the processor 15 that its address has been recognized. This interrupt is reset by decoding an interrupt acknowledge cycle for level 5.

Interrupt level 4—this is the machine check level activated when an adapter is the bus master and an error is detected by the control unit logic 27. It is reset by a MMIO command directed by ther microprocssor 15 through the MMIO control function register 28.

Interrupt level 3—this is the error recovery level and the interrupt is set when interrupt level 4 is set and is reset by decoding of an interrupt acknowledge cycle at level 3. This is also the operating level for the control program utilized in the communications control processor 15.

Interrupt level 2 is reserved.

Interrupt level 1 is utilized by communications adapters for operational and machine check interrupts from the adapters which result in vector numbers generated by the vector number generator in the arbitrator 29.

Interrupt level 0—this is the application task operation level into which no lower level interrupt may be interjected. Application tasks on this level run to completion or a stopping point, whichever occurs first.

Memory Data Flow

Data transfer between the memory control (not shown for simplicity) and the memory 16 is an 18-bit interface comprising 16 data bits plus 2 parity bits. For a write operation to memory, data can be stored from the control microprocessor 15 or from any of the attached DMA devices (adapters) either as single bytes or as words. Error correcting code control logic 30 will generate a 6-bit error correction control for association with the 16 data bits. Therefore, any write instruction that requires a 1 byte write will utilize a read-modify-write cycle so that the 6 check bits will accurately reflect the status of a 16-bit word. Word or half word operations are selected by upper and lower data strobes set by the processor 15. The lowest order bit of the address channel is utilized for the upper data strobe control in combination with the type of data transfer that is intended. If this bit is 0, the upper data strobe is issued. If this bit is 1, the lower data strobe is issued. Certain writing operations for DMA writing from an adapter 7 require a full word (2 byte) operation. Provision is made at the DMA interface for indicating to the control logic 27 the requirement for word transfers with activation of both the upper data strobe and the lower data strobe exists. This will cause the issuance of both data strobes.

On all word writing operations, the six error correction control check bits are generated in the ECC logic 30 and are stored along with the 16 data bits in the memory 16. The word write operation requires only one memory cycle but a byte write operation, the byte for which the address is given is read from the array along with its associated byte and the 6 check bits. The byte which is to be written is to be modified to reflect new data and then 16 data bits are used to generate 6 new check bits. The 16 resulting data bits and 6 new check bits are written back into the memory 16.

System Logic

The system logic is not all shown in detail in the figures since it is normally provided without modification. It includes the clock generation together with timing signals for the various logic functions, a program enable timer or counter that provides an interrupt on level 1 every half second when enabled, card select, chip select, address decoding for ROS and RAM and refresh operations, and memory mapped I/O functions as shown in the memory map I/O address decode block 28. This block includes the functions of decoding addresses for program control of an operator's control panel, not shown, set and reset of system control latches and the tri-state drivers and interrupt requests to the adapters 7 from the control unit 15.

A novel functional unit in system logic is the arbitrator and interrupt vector number generator 29. This handles arbitration of interrupt requests from adapters, arbitration of DMA bus requests to the main processor 15 for DMA operation, control, through issuance of a bus grant acknowledge signal, of the storage cycle for DMA operation and control of the tri-state address and data busses during the DMA operation. It also handles the interrupt vector number generation and interrupt request arbitration.

Bus Error/Machine Check Register

This register 26 stores an error indication whenever an error is detected. When this occurs, and the main processor 15 is the bus master, a bit will be set in the check register 26 and a bus error signal will be activated for one cycle which will result in a bus error exception processing routine being executed. Whenever an individual adapter 7 is the bus master and an error is detected in the control unit processor 15, a bit will be set in the bus error/machine check register 26 indicating that an adapter was bus master when the error was detected. A bit will also be set to indicate the cause of the error and a level 4 interrupt will be activated to the main processor 15. This will also cause a level 3 interrupt for error recovery routines to be run. Also, when an adapter 7 is bus master when the error occurs, the number of the bus master is saved in logic housed within the arbitrator 29 and can be read later with an MMIO instruction from the control processor 15.

The error signal is always activated to the level of the DMA interface regardless of which processor is bus master. If an adapter is currently the bus master, this error signal will cause that adapter 7 to disable all signals to the DMA interface. DMA access by all of the adapters will be blocked when bus error or machine check register bits are set. There are 16 bits in the bus error machine check register 26 and the outputs $E_1$ through $E_n$ are directed to the error detection and system tri-state control logic 27 in FIG. 2. The meaning of the various bits is defined as follows:

Bit 0—this is parity error. A parity check is performed on data written at the error correction control logic unit 30 or on data read at the control processor 15 input. These parity checkers are numbered 31 and 32 respectively. A parity generator 33 operates on the output of the main processor 15 to generate outbound parity as required.

Bit 1—this is a double bit error from random access memory 16. Error control and correction logic 30 is capable of correcting a single bit error but a double bit error activates a signal DBE for input to the bus error machine check register 26 as shown. The bus master when the error occurred will be indicated by bit 6 as will be described later. The most probable error is in the RAM whenever a double bit error occurs.

Bit 2—this is a refresh under run. This bit is generated by the random access memory units 16 and is shown as signal RU for the bus error machine check error 26. This is caused when a refresh selection cycle has not been activated within the specified time required for the dynamic refresh of the random access memory 16.

Bit 3 is an access error/data acknowledge timeout error bit. This error can be caused by any one of seven items. An attempted write to a protected area of RAM, attempted access to the MMIO space in RAM by an adapter 7, access to MMIO space by the main processor 15 while it is not in the supervisor data mode, an attempted read or write to an unimplemented area of RAM space, an attempted write to ROS, data transfer acknowledge not returned to the control processor 15 by a slave device, (either memory control or adapter) within 4 microseconds, or an adapter which has become bus master does not deactivate strobes within 4 microseconds. The exact selection of which of these possible causes is dependent upon whether various other bits in the machine check register are set as will be explained as follows.

Bit 4 is the timer interrupt not reset.

Bit 5 is the DMA timeout and will be set if an adapter having received bus grant does not return a bus grant acknowledgement in 2 microseconds.

Also an adapter which has been selected by an MMIO instruction from the control unit 15 which activates data transfer acknowledged for more than 2 microseconds will set this bit and failure by an adapter which is bus master to initiate a transfer cycle will set this bit. This is indicated by the adapters not activating the address strobe within 2 microseconds and will cause the bit to be set.

Bit 6 is the bus master indicator. If the bit is set, an adapter was bus master when the error was detected.

Bit 7 is the access type indicator. It indicates that the operation was a read operation at the time of the error if it is set; if it is not set, the operation was a write operation.

Bit 8 is the RAM write area protection violation and indicates that an attempted write to a protected area of RAM was made either by an adapter or by the main processor 15 while it was not in supervisor data mode.

Bits 9-11 are RAM card select bits indicating which section of RAM memory was selected when the detected error occurred.

Bit 12 is the ROS card select that indicates the ROS card was selected when the error occurred.

Bit 13 is the halt bit for the main control processor 15 indicating that it has been halted. The final bits 14 and 15 are not used in this design and are reserved.

Memory Mapped I/O

Memory mapped I/O control functions 28 are used to set and reset control latches, to write control information to the adapter 7 and to read an adapter's machine check register when required. In general, MMIO operations constitute I/O operations controlled by decoding an address within the addressable range of the address bus but not assigned to memory space. These addresses, when decoded, are used as control instructions for the control unit processor or for an attached adapter. MMIO operations are initiated by and controlled by the main control processor 15. The operation itself consists of the execution of a single load or store instruction that will transfer data to or from the addressed MMIO space. For MMIO operations, the control processor 15 will be the bus master and the operations must be performed in supervisor data mode. Operations performed by MMIO are as follows: reset of an adapter, (each adapter has a specific MMIO address for this command), enabling of an adapter, disabling of an adapter, interrupt to a specified adapter, reading of a machine check register in a specific adapter, setting a service interrupt to an individual adapter or resetting an adapter specifically without a basic asssurance test of the adapter or finally, a read of the diskette adapter programming switch.

There may be up to 18 adapters 7 in the design shown in FIG. 2 and these are assigned priority dependent upon their physical location. They are numbered sequentially with adapter 1 being the lowest priority for DMA and interrupts at the control unit for arbitrator 29. The highest priority is adapter 18 and is reserved for the diskette adapter function.

The MMIO logic also has decoders for decoding a wide variety of system control functions that are located with the main processor 15 or with the main memory control. However, four specific MMIO instructions are assigned to other elements. These are the bus master register 57, the data compare register 23, the address compare register 22, and the function select register 24.

DMA (Direct Memory Access)

In the architecture described in the figures, direct memory access is a bus master initiated I/O operation in which single or multiple bytes or words may be transferred to or from main memory 16. The bus provides 18 bits (16 data bits and 2 parity bits) of bidirectional data between the control unit memory 16 and the attached adapter 17 and/or the control processor 15. A bus master, for purposes hereof, is defined as a unit attached to the bus that is capable of controlling the system busses. The bus master will determine the direction of data transfer, will supply the address and control information to direct the transfer, and will supply the data during a writing operation. Because several units attached to the DMA bus are capable of becoming bus masters, arbitration by the arbitrator 29 determines which unit will be the active master at any one time.

Access to memory space in the memory 16 during a DMA operation is accomplished using a real address. The DMA operation by adapters 7 is a data transfer in which the address to be used is set up by the adapter 7. The interface is capable of handling a general case of DMA, where a DMA controller is set up with the starting address but this is not implemented in this design. The individual adapters 7 obtain starting address positions and counts from the control unit processor 15 which stores address information and transfers it via DMA to the attached adapters. This transfer is initiated and controlled by the adapter itself, however. There are no designated reserved spaces assigned to each adapter in main memory and the adapter's assigned memory space may vary from time to time.

DMA Interface Signal Description

The DMA interface includes a bidirectional data bus of 18 bits width, 16 data bits plus 2 parity bits. The data bus is positively active. During a DMA read operation or during a MMIO write operation from the control unit processor 15 to an adapter 7, the data bus is driven by the control unit logic connected to processor 15.

The address bus is a multipoint, 23-bit bus and is also bidirectional and positively active. When a DMA operation is not in progress, the external address bus is driven by the control processor 15 to allow monitoring of addresses. This bus is driven by the logic connected to the control processor 15 during MMIO control operations from the processor 15 to the adapter processors in the adapters 7.

The write signal—this is a multipoint signal line driven by the bus master to indicate to tri-state isolation control logic the direction of transfer on the data bus for all I/O operations. This will be described in greater detail later. During DMA operations, activation of this signal indicates a data transfer from a bus master to memory. Non-activation of the signal indicates data transfer from memory to a bus master and is referred to herein as a read operation.

Other control lines and busses on the interface include the following:

A level 1 interrupt. This is a multipoint signal which is driven by any adapter that has a pending level 1 interrupt for the control unit processor 15. An adapter 7 activates this signal line when it has a data interrupt or an adapter machine check interrupt.

A level 6 interrupt. This is a multipoint signal which is driven by any adapter 7 that has a pending level 6 interrupt for the control unit processor 15. This is activated when a control interrupt requires servicing.

A level 1 interrupt acknowleged signal is also supported and this is activated by the main processing controller 15 when an interrupt acknowledge cycle for a level 1 interrupt from the adapters is performed.

Level 6 interrupt acknowledge is a multipoint signal activated by the main processor 15 when an interrupt acknowledge for level 6 is performed.

There is a bus request/interrupt request bus. This is an 18 line bus with one bus line assigned to each adapter position. The bus is multiplexed by the arbitrator and interrupt vector number generator 29 so that it serves both as a means of handling bus requests and adapter interrupt requests. When the control processor 15 does an interrupt acknowledge cycle for level 1 interrupts, system logic in the control unit will activate level 1 interrupt acknowledge to the adapters 7. When an interrupt acknowledge cycle for level 6 occurs, a level 6 interrupt acknowledge signal to the adapters will be given. When the level 1 interrupt acknowledge line is active, the adapter 7 which is requesting an interrupt will activate its bus request if it had a level 1 interrupt presented to the controlling unit 15. This is interpreted by the arbitrator as an interrupt request. The same operation occurs for a level 6 interrupt acknowledge. If neither level 1 or level 6 interrupt acknowledge are active, the adapter can activate a bus request line when it has a DMA request.

Bus request line operation. When the level 1 or level 6 interrupt acknowledge signals are not active, an adapter having a DMA request can activate its bus request/interrupt request line which will be interpreted as a DMA request by the arbitrator. This line is driven by any attached adapter 7 which requires control of the bus for an I/O operation. When an adapter activates its bus request/interrupt request line for its bus request, it must keep it active until it has gained bus ownership. The bus request will be removed if the level 1 or level 6 interrupt acknowledge line becomes active or if an adapter becomes disabled. When an adapter has been granted access, it becomes bus master for the duration of its transfer activity.

The interrupt acknowledge line. When the main processor 15 is doing an interrupt acknowledge cycle in response to a level 1 interrupt, a level 1 interrupt acknowledge line is activated to the adapter 7. The same is true for a level 6 interrupt and the level 6 interrupt acknowledge line. Either of these acknowledgement signals controls the adapters to remove the DMA bus requests from the bus request/interrupt request lines. If a level 1 interrupt acknowledge is active, an adapter having a level 1 interrupt presented to the control unit processor 15 will activate its bus request/interrupt request line. The same is true for a level 6 interrupt acknowledgement for adapters having level 6 interrupts present. Interrupts are encoded by the arbitration logic in the arbitrator 29 and the adapter having the highest priority will have its request presented to the processing unit 15 in the form of an interrupt vector number that will direct the processor 15 to the starting address of the servicing routine in memory for the specific type of interrupt presented.

The bus grant/interrupt taken bus is an 18 signal bus with one line assigned to each adapter position as noted above. The bus is multiplexed by the arbitrator 29 to handle bus grants and for signaling an interrupting adapter that its interrupt is being taken by the control unit processor 15. If an individual adapter 7 recognizes a bus grant/interrupt taken signal active during a level 1 or level 6 interrupt acknowledge, it will activate its encoded interrupt type lines (3 bits) to correspond to the type of interrupt that it is presenting to the control unit 15. The multiplexing operation in arbitrator 29 is achieved as follows.

Bus Grant Operation

This signal is driven by bus arbitration logic in the arbitrator and is given to the device that is to assume ownership of the bus. Since there is more than one unit that may be requesting ownership, the system provides arbitration logic in the arbitrator 29 to resolve which unit will be allowed to control the bus. The star method of arbitration that provides prioritization based on physical position is implemented in the figures as shown. The adapter installed in position 1 (which may correspond to adapter number 18) will have the highest priority and the adapter installed in the last position of the arbitrator's connection ports will have the lowest priority. The bus grant is not deactivated once activated until after an activation of the bus grant acknowledge or upon detection of a bus grant not accepted. Adapters 7 are not permitted to activate any signal on the bus in the capacity of bus master unless they have detected the activation of a bus grant while they have an active bus request signal present.

The Interrupt Taken Operation

When a level 1 or level 6 interrupt acknowledge signal is active, the control unit 15 will activate the bus grant/interrupt taken signal to the adapter whose interrupt is being acknowledged. When an adapter recognize that its bus grant/interrupt taken line is active and it has a corresponding interrupt on level 1 or 6 present, the adapter will activate an encoded interrupt type lines to indicate the type of interrupt it is presenting to the control unit. A unique interrupt vector from the highest priority requesting adapter will be generated by the arbitrator interrupt number generator 29.

Bus Grant Acknowledge

The bus grant acknowledge signal is a multipoint signal used for obtaining bus mastership during DMA operations. This signal is activated by the adapter 7 that has an active DMA bus request and which receives the bus grant. After receiving the bus grant, the adapter must wait until the address strobe, data transfer acknowledgement and bus grant acknowledgement from the previous bus master are all deactivated before it can activate its own bus grant acknowledge signal. Bus mastership is terminated at the deactivation of bus grant acknowledge.

The address strobe signal is a multipoint signal driven by a bus master when it executes a DMA operation. The upper and lower data strobes are also driven by the bus master with one or both being utilized to indicate whether single byte or word operations are required and whether the byte is low order or high order.

Data Transfer Acknowledge

This signal is a multipoint signal driven by any addressed adapter, the memory control or the system MMIO logic during an I/O operation. It allows for asynchronous operation between the adapters and the control unit memory system during DMA operations and asynchronous operation between the main processor 15 and the adapter 7 during a main processor MMIO operation. In writing operations, the data transfer acknowledge is an indication that the slave device has captured the information on the interface and the cycle may end. In read operations, the data transfer acknowledge is an indication that data is placed on the data bus by the slave and can therefore be read in by the control processor. During DMA operations, the slave device is the main memory and the data transfer acknowledge is supplied by the memory control. During MMIO read/write cycles from the control unit 15 to an adapter 7, the addressed adapter is a slave device and must supply the data transfer acknowledge signal.

Error Signal

This is a multipoint signal driven by the memory control logic in the error detection and system control 27. It may be an indication of one of the following: (1) bad parity on data received from an adapter, (2) read or write to an unimplemented storage space, (3) attempted write to ROS or a timeout condition resulting from adapter having received a bus grant but not responding within two microseconds, (4) a timeout resulting from an adapter not deactivating a strobe within a timeout period, (5) a double bit error from main RAM or (6) a storage protection violation error. The error signal is detected as an input by the active bus master I/O microprocessors which then must disable any signal that is active on the interface to the control unit processor 15.

System Reset

This is a negative active signal activated by the control unit 15 when any of the following resets occurs. Power on reset, reset executed by an MMIO instruction, reset from a service adapter, disk dump reset or execution of the processor reset instruction.

Service Interrupt

The service interrupt can interrupt the main processor on interrupt level 6. The adapter can activate the service interrupt signal and the main processor 15 will reset the service interrupt by reactivating a service interrupt acknowledge signal. The service adapter must reset its interrupt when the acknowledgement signal is received. The signal line only connects from the service adapter to the control unit 15.

The adapter select line 35 is a negative active signal activated by the main processing unit doing MMIO operation to an adapter 7. The adapter will decode the low order 8 bits present on the address bus when the signal is active to determine which adapter is selected and what function is to be performed.

Service adapter reset is a negative signal and activated by the service adapter which causes the control unit 15 to activate a system reset to reset the entire machine except for the service adapter. The service interrupt acknowledge signal is a point-to-point signal from the control unit 15 to the service adapter as previously noted.

Service Interface

Returning to FIG. 1, it will be noted that the service adapter 8 has its own dedicated service interface 11 which has just been described above. This interface has access to a variety of registers that aid in software debug and system hardware error diagnostics. To aid in software debugging functions, the control unit 15 implements a variety of registers or latches shown in FIG. 1 specifically. These are accessible over the dedicated service interface 11. These also interface to the interrupt logic 66 which will create an interrupt on level 5 over line 25 to the main processor 15 if an address previously loaded into the address comparison register for diagnostic purposes is detected and the conditions specified in the function register 24 are met. The same is true for the data comparison register 23 and for the function register 24 all of which comprise, together with MMIO control and decoder 28 and the interrupt control logic 66, the control serviceability functions. The function register 24, address compare register 22 and data compare register 23 are together referred to as control logic 67 in FIG. 2.

As shown in FIG. 1, a two byte status register 18 is also included. This register can be written by the main processor 15 and read by the service adapter 8. The main processor is not permitted to read this register and the service adapter is not permitted to write in this register. There is a bus error machine check register 19 with dual port outputs for the machine check register portion so that it can be read by either the control unit processor 15 or the service adapter 8. The machine check register and a program status register do not contain parity and parity checking is inhibited when these registers are read by a service adapter 8.

There is also the service adapter ROS 17 as shown in FIG. 1 which is interfaced to the service adapter over a dedicated two byte data bus, a 15 bit address bus and control bus and this dedicated interface will be used by the service processor 3 for instructions to read the control unit 15 machine check register and status register 19 and 18, respectively.

Interprocessor Interrupts

Interprocessor interrupts either between the control processor 15 and the adapter processors in each adapter 7 or vice versa may be accommodated. The control processor 15 can interrupt an adapter processor by memory mapped I/O instructions. One of the MMIO instructions is used to signal a selected adapter to do a DMA read operation of its presently assigned communications buffer in main memory 16. The other is used to interrupt the adapter on a higher priority level to provide a servicing function. The interrupt interface from the control unit 15 to the individual adapter 7 consists of the low order 8 bits of the DMA address bus and a multipoint selection line called line adapter selection. When this line is active, each adapter will compare 5 bits on a DMA address bus with a 5 bit location address permanently wired at the board position where the adapter 7 is installed. When an address compare occurs, that adapter will decode the other 3 bits on a DMA address bus to determine the selected MMIO function.

Adapter to Control Unit Interrupts

Adapter interrupts to the main processor 15 on interrupt level 1 or level 6 are possible as described previously. The service adapter has the same interrupt capability as a line adapter plus it has the capability to interrupt the main processor on interrupt level 6 for a service adapter to the main processor interrupt. Interrupts from these processors to the main processor are all handled as previously described.

Figure 6:
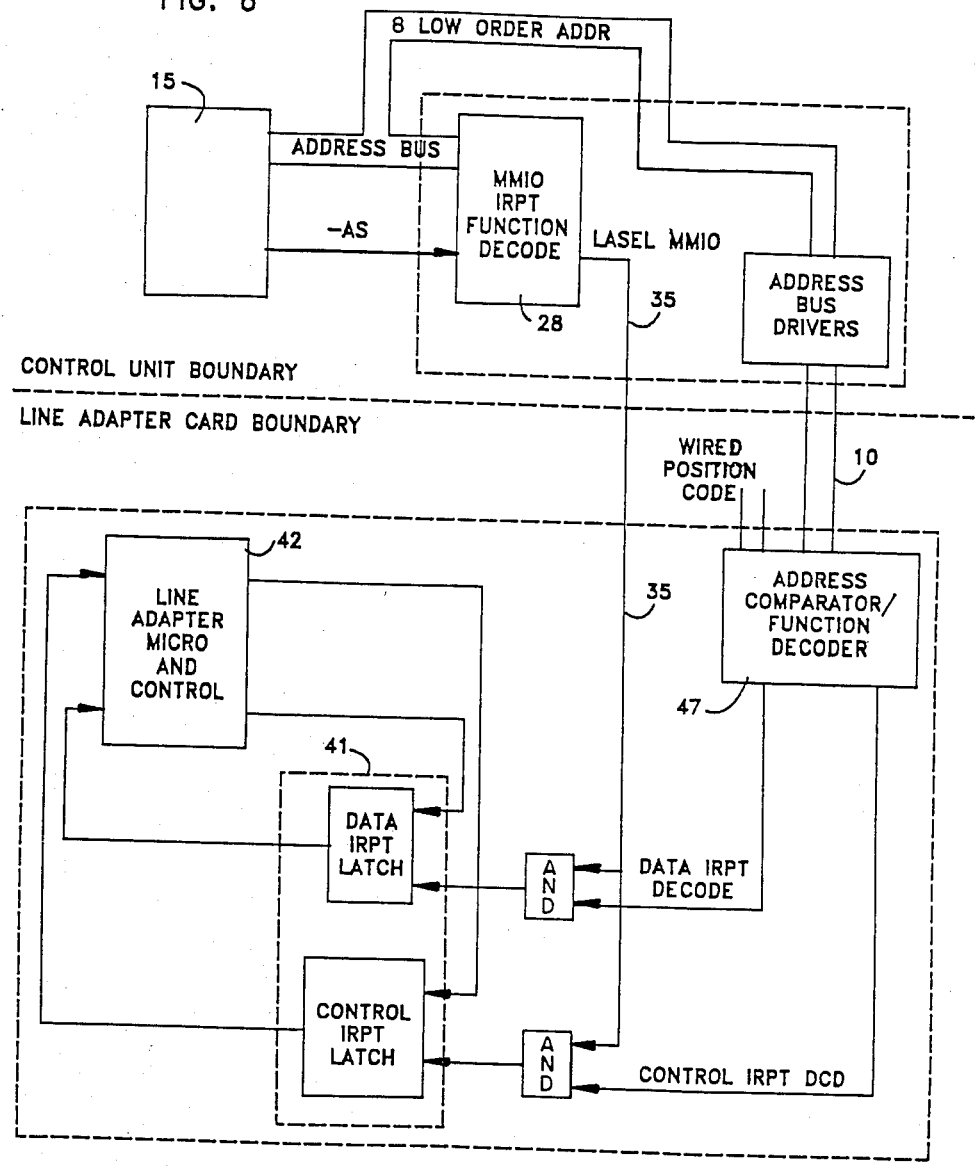
FIG. 6 illustrates the data flow for a control unit processor to communication line adapter processor interrupt operation.

FIG. 6 illustrates the data flow for a processor 15 to line adapter processor 42 interrupt function. FIG. 6 should be used in conjunction with FIG. 3 to gain a better understanding of the overall operation, but FIG. 3 will be described in greater detail later. In this function, the control unit processor presents the address bus and the address strobe signal to the MMIO logic 28. The high order address bits A9-A23 are decoded by the MMIO logic 28 and the adapter select signal 35 is presented along with the low order 8 bits A1-A8 to the address bus driver for the interface bus 10. These signals will be received by the address comparator and function decoder 47 housed within the indivdual adapter 7. Also housed in the adapter 7 is the interrupt control logic 41 and the line adapter microprocessor and control 42.

Figure 7:
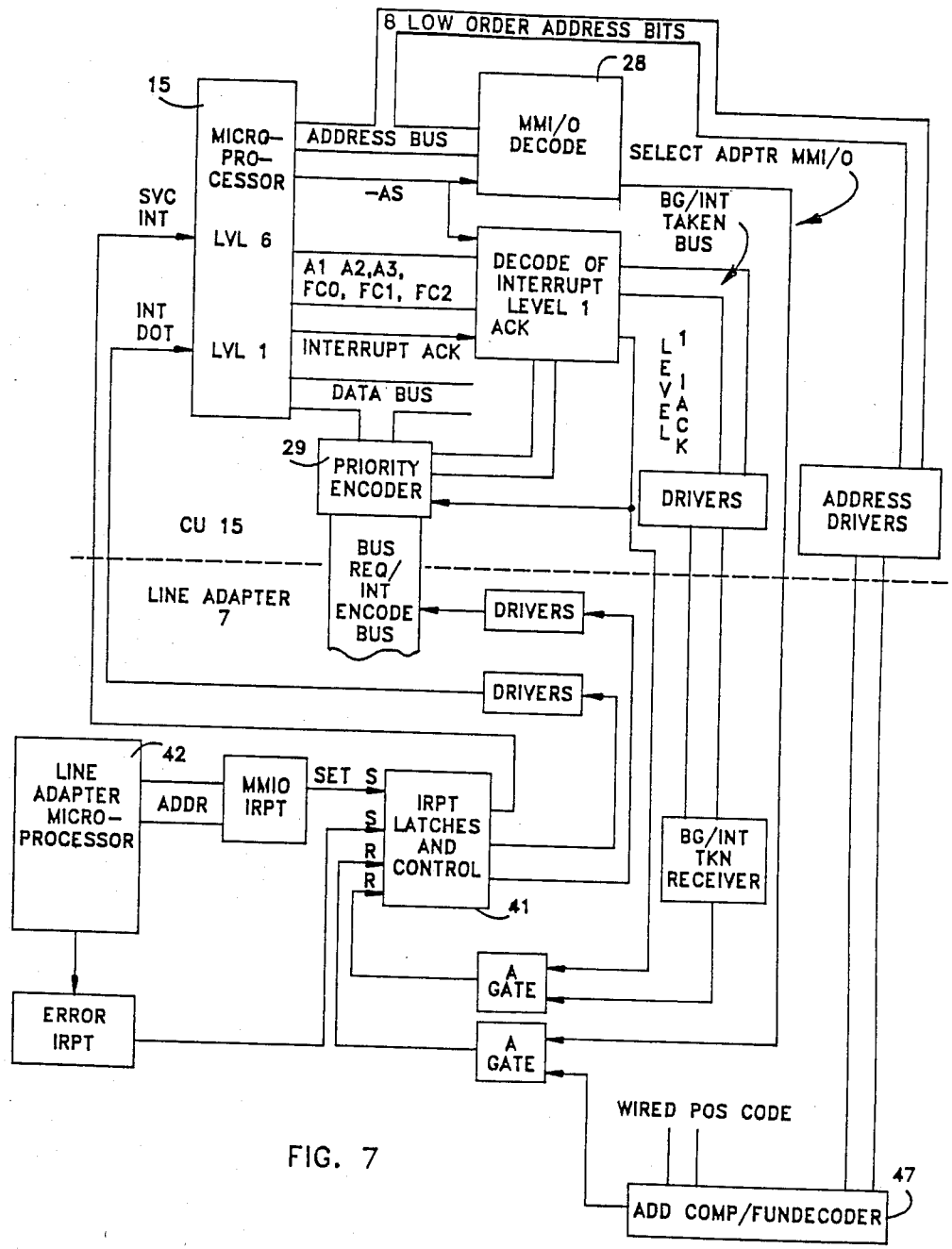
FIG. 7 illustrates the data flow for a communication line adapter to control unit processor interrupt.

FIG. 7 illustrates the communication line adapter 7 to control unit processor 15 interrupt function and includes the priority encoder circuit in the arbitrator 29.

With the foregoing brief overview of the main functional elements, control signals and inter-relationships given as described, a detailed example of data flow from initialization, commands, receiving and transmitting of data together with arbitration for a DMA operation and for interrupt operation will now be given.

Data Flow

Initialization

Each adapter has a communication region temporarily assigned to it and located in the main memory 16 of the control unit 15 RAM. This region contains a device status word (DSW) register 20 and a device control word (DCW) register 21 for each adapter 7. The location of a given adapter's DCW and DSW in the main RAM 16 will be determined by the adapter's physical position but the space allocated by the control processor may vary within memory 16. When the machine is reset, the control program will initialize the DSW and DCW for each adapter 7 that is installed. The DCW will be constructed by the control unit 15 executing microcode. The DCW will be read by the adapter processor 42 to initialize itself. The DCW contains a command byte and an outbound or inbound buffer address plus other fields depending upon the nature of the command. During operation, the device status word is constructed by the adapter processor microcode in the adapter processor 42. It will contain fields that report the status of the adapter processor 42, the quality of data reception, current execution sequence and the address of the last buffer used for data transfer.

When an adapter processsor 42 detects an interrupt from a control unit processor 15, the adapter will fetch the device control word from its assigned communication region in main RAM 16 via a DMA operation and will interrogate the command byte to learn what the control unit 15 is requesting. One of the many commands is an IPL command. This command will cause the adapter 7 to load its operational code via DMA from the main RAM 16. The main RAM starting address is contained in the DCW which was just read. When the command is completed, the adapter processor 42 will write an ending status via a DMA transfer into its related DSW. The adapter processor 42 will then signal the control unit processor 15 via an adapter to control unit interrupt that the task is completed.

The flow is controlled by microcode in the control unit 15 which sets up the device control word and then interrupts an adapter 7. The adapter reads the device control word via a DMA operation and the adapter microcode will set up a device status word in main RAM 16 using a DMA writing operation and will then interrupt the control unit 15 to inform it that the operation is complete. The control unit 15 can then read the device status word in main RAM to learn the results. It is seen that the main RAM thus serves as a communicating "mail box" between the control unit processor 15 and the communications control processors 7 using communication regions in the main RAM assigned for each adapter 7.

Data Buffers

Data buffers are addressed by a byte in the device control word and reside in main RAM 16. They are accessed by the adapters using the DMA transfer initiated by the adapters. The buffer size is fixed but may be assigned in variable numbers of blocks. When a message of greater than a fixed, for example 288 data byte size, is intended, larger blocks of 288 bytes each are furnished to the adapter processor requesting them.

DCW Commands

When an adapter processor detects an interrupt from the control unit 15, it must transfer its device control word from its assigned communication region in RAM via a DMA read operation and then interrogate the command byte. Examples of commands might be to write or to read. If it is a write operation, the buffer whose first address appears in the device control word is read from RAM and transmitted into the communication line and the number of bytes to be transmitted is specified in the data count portion of the DCW. A read operation begins by writing to the starting address identified in the DCW and extending for a data count or until an end of block detection, whichever occurs first. A write command indicates a transmit operation where data is read from RAM. A read command indicates a receive operation where data is written to RAM.

Given this overall scheme of communication, it may be seen that each adapter microprocessor is constructed to interrupt the main microprocessor for service but can autonomously present DMA transfers to or from main memory to build up or take down queues of messages to or from given attached users at each adapter interface. Since each adapter is assigned the task of adapting to the user's protocol and signaling requirements at the interface but communicates with the main RAM 16 only in the form of pure data without format and protocol strictures, a great deal of concentration of data is possible. The control unit processor 15 waits for completion of a message in RAM and the signalling that the message has been completed by the adapter processor before it will inspect the message, direct it to an outbound adapter processor and perform any data manipulations required to accommodate diverse communication protocols. The resulting messages on a high speed outbound line are thus multiplexed in the sense that complete messages from a variety of users will be serially transmitted as complete messages but not necessarily in the order in which they were begun, but in the approximate order in which they were completed.

Figure 3:
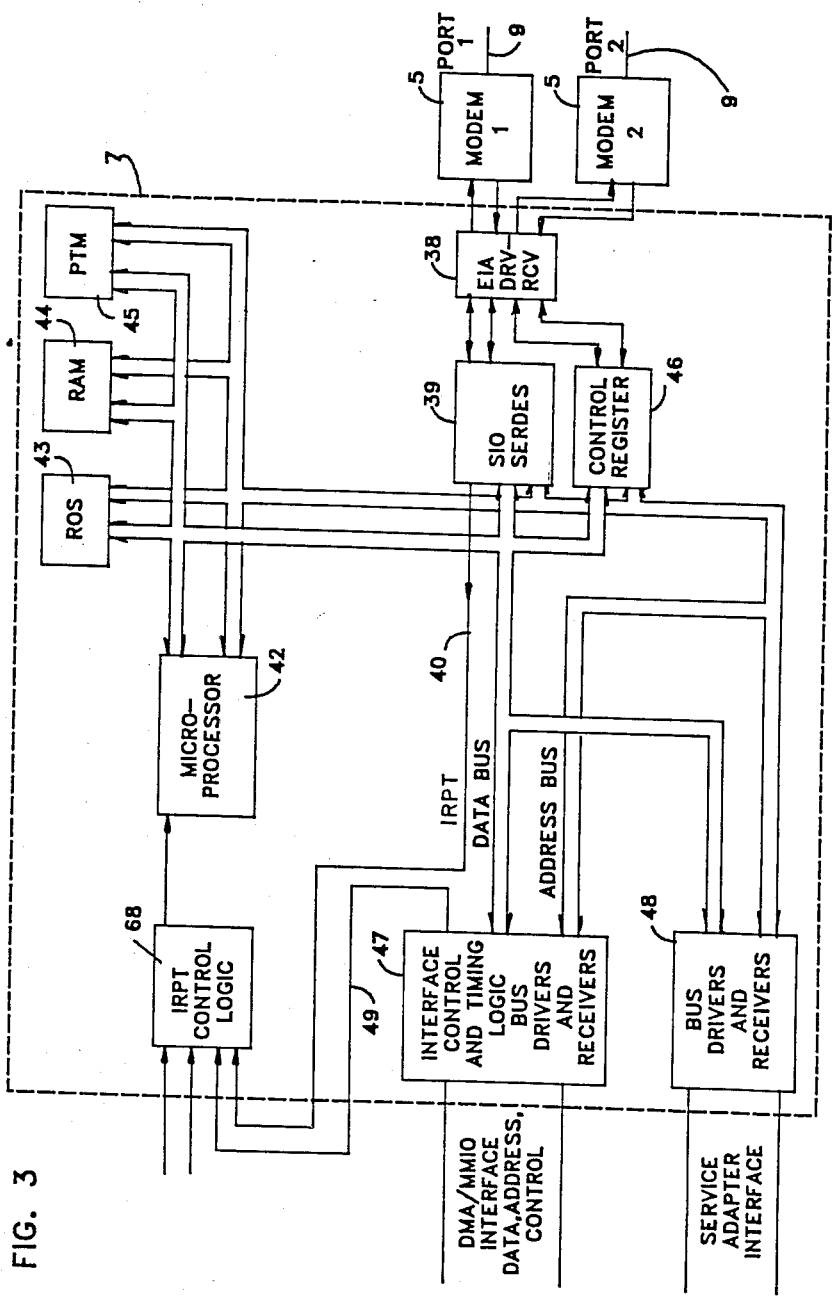
FIG. 3 illustrates an example of an interface adapter processor in greater detail.

For a description of the overall adapter data flow for a receive operation, we will now turn to FIG. 3 to be used in conjunction with FIGS. 1 and 2.

Adapter Data Flow During Receive Operation

Refer to FIG. 3 in which data is received at the interface driver receiver 38 from modems 5 attached to ports 9. The interface driver receiver 38 may be the EIA.RS232 type or any other standard interface. The driver receiver has the purpose of converting the receive voltage levels from the modems 5 to the transistor logic voltage levels for the remaining components. A serializer/deserializer and formatter 39 is implemented in the form of a Zilog Corporation model 8440, for example. This provides the function not only of serialization and deserialization, but of formatting and deformatting according to the communication procedure requirements. This includes adding or deleting frame characters, sync characters, generating block check characters, and the like. The unit 39 receives serial data and accumulates an 8 bit byte. This device then interrupts the interface adapter processor 42 via an interrupt line 40 that is passed through interrupt control logic 41 to sort out potentially interfering interrupts.

The processor 42 may advantageously be a model 68000 microprocessor built by the Motorola Corporation as is the main control processor 15. The incoming byte of data is then read from the serializer/deserializer 39 using a MMIO operation for reading. As the serializer/deserializer 39 receives the next byte of data, it again interrupts the processor 42 and the process of reading by the processor 42 continues.

Processor 42 accumulates a word, i.e., two bytes of data in its internal data register. Upon completion of accumulating one word, processor 42 is ready to transfer the two bytes as a word transfer to main RAM of the control unit 15.

The DCW that has been previously read from the main RAM 16 contains the address information used by the adapter 7 in its processor 42 to address the main RAM 16 during the DMA data transfer operation. The layout of data buffers in the main RAM 16 is mapped in such a fashion that the adapter can directly address the main RAM during the DMA operation. The main RAM portion is located in address space in such a fashion that bit 23 of the system address is not activated during a main RAM access. Then, when an adapter performs a DMA write operation, the adapter 7 performs the write operation with bit 23 active. An operation with bit 23 active will set the DMA request latch. This will activate a DMA bus request to the control unit 15. This latch and the interrupt line are part of the interface control and timing logic 47 in FIG. 3.

The arbitration unit 29 in the control unit 15 will activate the bus grant signal to the specific adapter 7 when the adapter 7 becomes the highest priority requester. For the duration of time between the presentation of a bus request by the adapter and the reception of a bus grant by the adapter, the adapter is held in the writing cycle with its address bus, data bus and control signals all active. When the bus grant is finally received, the interface control logic 47 will activate the bus grant acknowledge signal and then will sequentially do the following operations:

The address bus will be gated onto the DMA address bus 10 in FIG. 1 and 2, but bit 23 will be driven to an inactive state to accomplish correct mapping in the main RAM. The adapters' control signals will be gated to the DMA control signal interface and the data bus will be gated onto the DMA data bus 10 in FIGS. 1 and 2. The main control unit 15 will perform the writing operation to the RAM 16 and will activate the data transfer acknowledge signal to the adapter 7 when the data has been written in memory. When the adapter 7 receives the data transfer acknowledgement signal, its interface control logic 47 will sequentially deactivate the signals to the DMA interface and the adapter's processor 42 will complete the writing operation cycle.

The foregoing sequence is repeated for every two bytes received from the communication line until the end of the message or end of transmission block is received and recognized by the processor 42. When this occurs, processor 42 will signal the main control processor 15 that the end of block has occurred. At this point, the main processor 15 takes over to perform any data manipulations on the stored block of data in RAM 16, generate any required header or trailer codes and will direct the block of data to appropriate adapter for output on a line addressed to the intended recipient for the original message. The adapter 7 at the selected output interface will format the block of data two bytes at a time with appropriate framing and control characters to meet the protocol and interface line requirements for the communication line to which it is connected.

The transmit operation at an adapter is as follows.

Adapter Data Flow During Transmit

During transmission, the adapter's processor 42 DMA fetches two bytes at a time into its register and delivers them to the serializer/deserializer 39. As the serializer/deserializer 39 empties its transmission buffer (every two bytes), it will present an interrupt to the adapter's processor 42 by activating an interrupt signal on line 40 to the interrupt control logic 68. The processor 42 will then perform an additional DMA reading operation to fetch two more bytes from the main RAM 16. As during the receive operation, the DCW that was previously read from main RAM contains the address information used by the adapter 7 to address the main RAM 16 during the data transfer operation. When an adapter performs the DMA reading operation, it will perform it with bit 23 active to present a signal to the DMA request latch in the interface control logic 47. This will activate a DMA bus request to the arbitration unit 29 of the control unit 15 as during receive operations. The arbitration logic 29 will activate a bus grant signal when the adapter 7 becomes the highest priority adapter with an active request. When the adapter finally receives the bus grant signal, the interface control logic 47 will activate the bus grant acknowledge signal back to arbitrator 29 which, in turn, activates it to the main processor 15 and will sequentially do the following:

The address bus will be gated to the DMA address bus to receive information. Bit 23 will be driven inactive to accomplish the correct mapping to RAM. The control signals at the DMA control signal interface will be timed to meet the main processor 15's timing specification. Since it is a reading operation, the adapter interface control logic 47 is conditioned to receive data from the interface (this includes setting the tri-state drivers in FIG. 1 or 2 to the appropriate state). The memory control logic of a control unit 15 will perform the reading operation from main RAM 16 and will activate the data transfer acknowledge signal to the adapter 7 when the data is active at the DMA interface. When the adapter 7 receives the data transfer acknowledge signal, the interface control logic 47 will sequentially deactivate the signals at the DMA interface as the processor 42 completes the reading operation cycle.

The two bytes that are read during the DMA reading from main RAM 16 are stored in the adapter 42's internal data register. The adapter processor 42 will perform an MMIO writing operation to transfer one byte of data to the serializer/deserializer. When the serializer/deserializer 39 has transmitted the byte through the driver receiver 38, it will again interrupt the adapter processor 42 to signal that its transmit buffer is empty. The sequence is repeated for every two bytes of data to be transmitted on the communication line through port 9. This is continued until the DMA transmit count becomes 0 or an end of block is reached. As noted previously, the serializer/deserializer 39 contains necessary logic for generating block check characters, frame characters and control characters as necessary to meet the protocol and format requirements for the communication line to which it is attached.

The description will now turn to a detailed example of the operation of the arbitrator 29 in FIGS. 1 and 2.

Arbitrator Operation

Figure 4:
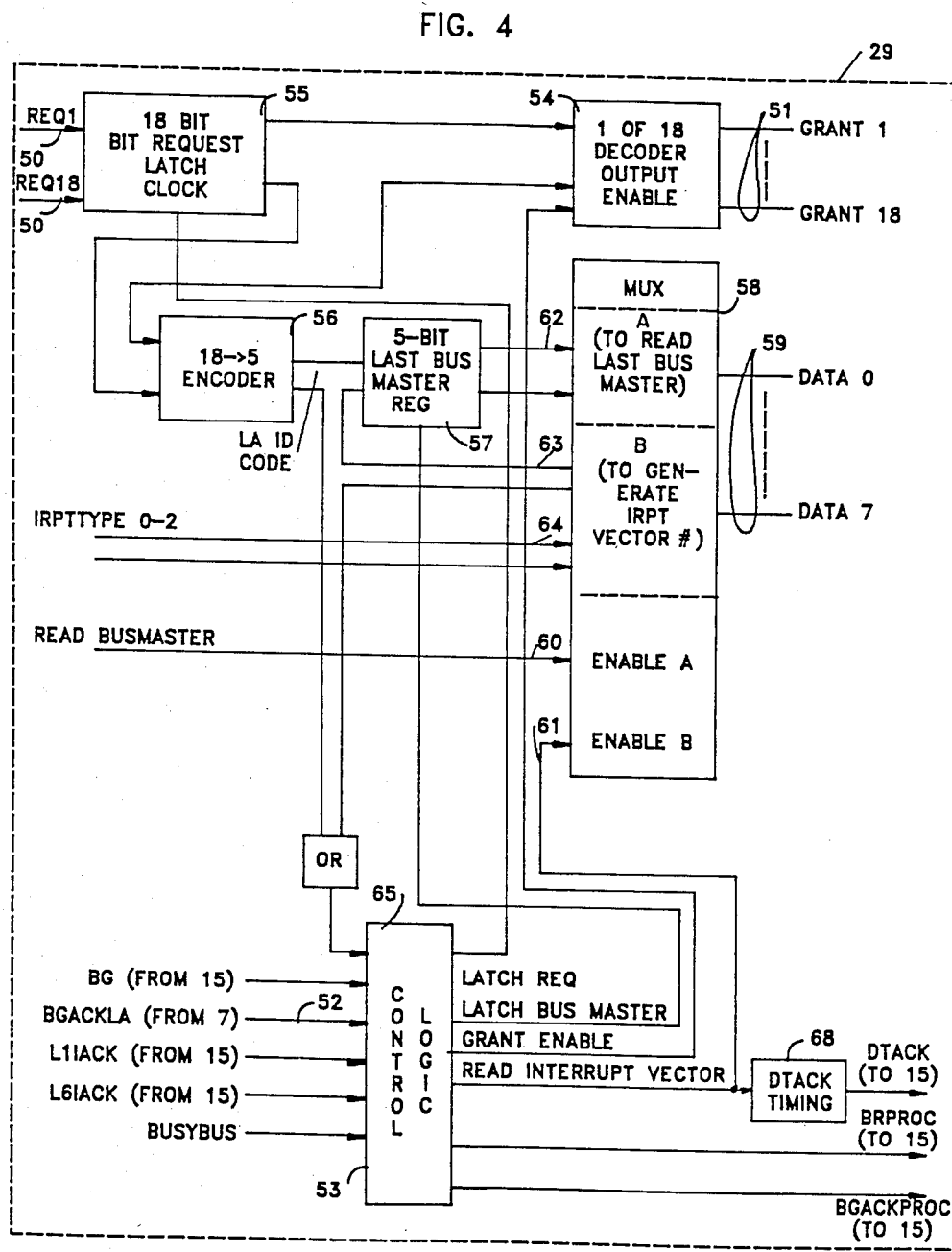
FIG. 4 illustrates an improved arbitrator with multiplexing of interrupt requests and bus grants in accordance with the teachings herein.

The arbitrator is shown in more detail in FIG. 4. Arbitrator 29 has the function of arbitrating among simultaneously presented interrupt requests from the adapter unit 7 or for arbitrating simultaneously presented bus requests for doing DMA operations at the adapters 7. Each adapter has a bus request signal line and a bus grant signal line as shown in FIG. 2 which are connected to the arbitrator 29. These signals are multiplexed for DMA operation and interrupt request operations and the generation of interrrupt vector numbers. The arbitrator 29 will provide arbitration for up to 18 different adapters. Adapter number 18 is given the highest priority and adapter 1 the lowest.

Referring to FIG. 4, each adapter will present a bus request signal on one of the lines 50 and may receive a bus grant signal on one of the lines 51. The signals, as noted previously, are multiplexed for DMA operations, interrupt request operations and for the generation of interrupt vector numbers which are generated in the arbitrator 29. An example for the DMA operation will be given first.

Let us assume that adapter 10 and adapter 3 have contemporaneously activated their bus request signals on the lines 50 for the doing of a DMA read or write operation. Request latch 55 will latch the state of the 18 possible bus request signals on lines 50. This occurs when the control logic 65 activates the latch request signal as shown. The bus request signals will be latched to sychronize the arbitration operation in such a fashion that the inputs to the encoder 56 and the decoder 54 will not change during the arbitration of the requests.

When at least one request has been latched into the request latch 55, a bus request proceed signal will be activated to the processor 15. The processor will respond by activating a bus grant procedure signal back to the arbitrator 29 where it is received at the control logic 65.

The output of the request latch 55 feeds the input of a decoder 54 that generates a grant signal on one line based upon the highest priority active request that is apparent in the latch 55. In the example we have assumed, number 10 has the higher priority than number 3 and a bus grant signal will be activated to device 10 over one of the lines 51 when the control logic 65 activates a grant enable signal as shown.

The output of the bus request latch 55 also feeds the input of an encoder 56. Encoder 56 is an 18 bit to 5 bit coder that selects the highest priority requester and encodes a 5 bit identifier code. This is the adapter identification and identifies that adapter 7 which will be given the bus grant signal by the decoder 54. This code from encoder 56 is also stored in the last bus master register 57 when the control logic 65 activates the latch bus master signal as shown. This preserves a record for error control that can be accessed by the processor 15 when it wishes to discover who the last bus master was.

When the adapter 10 that was requesting service receives a bus grant signal on one of the lines 51, it will activate the bus grant acknowledge signal back to the arbitrator 29. This is shown on line 52 connected to the logic unit 65. This will indicate the start of DMA operation that was requested.

The control logic 65 will then activate a bus grant acknowledgement to the processor 15 and keep it active so long as the bus grant acknowledgement from the adapter 7 is active. This is true provided an error condition does not occur. When an adapter 7 activates the bus grant acknowledgement signal, the arbitrator 29 in its control logic 65 will also remove the grant enable signal and activate a latch request signal for resampling any bus request lines 50 in preparation for the next DMA cycle.

If an error condition does occur during these cycles, the processor 15 can perform an MMIO operation and read the contents of the last bus master register 57 for diagnostic purposes. The bits in this register are gated to the system data bus over lines 59 by the multiplexer 58 when an MMIO operation to read occurs. This signal is provided on line 60 from the MMIO control address decoder 28 in FIG. 2.

Arbitrator Interrupt Operation

Normal reading of interrupt vectors by the processor is provided by the logic 65 gating a signal on line 61 to enable the generation of the interrupt vector in the multiplexer 58. The multiplexer 5 generates an interrupt vector address number based upon the adapter identification code from the encoder 56 which is received over the internal bus 63 and is utilized, together with the interrupt type from the adapter 7 over bus 64 to generate the interrupt vector number that appears on the data bus 59. This will be described more fully below.

If the processor executes a level 1 or level 6 interrupt acknowledgement cycle in response to a level 1 or level 6 interrupt from any adapter 7, the arbitrator 29 and the adapter 7 switch to the interrupt mode of operation. In this mode of operation, the bus request signals are used to signify interrupt requests and the bus grant signals are used to signify interrupt grants. Assuming that adapter 10 and 3 have activated level 1 interrupt requests, (these requests are ORed together as an indication that one or more adapters have a level 1 interrrupt request) the request latch 55 will latch the state of the 18 possible bus request signals on lines 50. This occurs when the control unit 65 activates the latch request signal as shown. The bus request signals are latched to synchronize arbitration operations so that the inputs to the encoder 56 and decoder 54 remain stable during arbitration process.

The output of the request latch 55 feeds the input of the decoder 54 which generates a grant signal based upon the highest priority active request latched into the requesting latch. It is noted that the presence of a bus request presented from one of the 18 possible adapters on lines 50 is interpreted to mean an interrupt request because the level 1 or level 6 interrupt acknowledge line is active.

The output of the request latch 55 feeds the decoder 54 and generates an interrupt grant signal based on the highest priority active request, which in this case will be given to requester 10 which is a higher request priority than number 3. This will be activated when the control unit 65 activates the grant enable signal as shown and an output on one of the lines 51 will be fed back to the highest priority requesting adapter 7.

The output of the request latch also feeds the encoder 56 which generates the adapter identification code. Instead of storing this code in the last bus master register as is done during DMA operations, this code is gated directly onto the lower 5 bit portion of the data bus. This represents the identity of the unique requestor selected by the arbitrator.

This code identifies that adapter which was given the bus grant enable (acting as an interrupt grant enable in this particular function). The granted adaptor's interrupt type code bits are also gated on bus 64 through the multiplexer 58 to the system data bus over lines 59 which are connected on bus 13 data portion in FIG. 2. This provides the 8 bit interrupt vector number that corresponds to the number of the adapter whose interrupt is being acknowledged and also gives the reason for the interrupt due to the three encoded interrupt type bits. A data transfer acknowledge generator 68 will then generate the data transfer acknowledge signal which causes the processor 15 to read in the interrupt vector number and end the interrupt acknowledgement cycle.

When the level 1 interrupt acknowledge signal is made inactive, the arbitrator 29 and the adapter 7 return to the DMA mode of operation.

The operation for level 6 interrupts is the same as for level 1 with the level 6 operation under control of the level 6 interrupt acknowledge signal generated by processor 15 as well.

A final topic is the conditioning of the tri-state latches 12, 14, and 34 to accomplish the appropriate directional control of the busses 13, 10.

Tri-State Control Logic

Figure 5A:
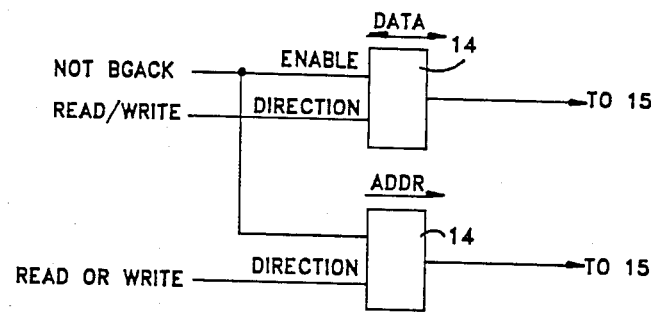
FIGS. 5A through 5D illustrate logical circuitry servicing the enable and disenable of the tri-state driver receivers incorporated in FIGS. 1 and 2.

The tri-state driver/receiver latches 14 that are connected to the output of the processor 15 in the main control unit are shown in FIG. 5A. The tri-state driver and receivers 14 are logical devices that are enabled by the condition of not bus grant acknowledge in addition to the fact that a read or write cycle is present to control the direction of the driver and receiver pair. These tri-state driver and receivers 14 isolate the input and output of the microprocessor 15 or control the direction of flow as necessary. It will be noted that the data bus interface 14 in FIG. 5A is bidirectional since the data may flow in or out of the processor 15. However, the address driver is out only for either a read or a write. In contrast, the data bus driver receiver 14 is one direction for a read cycle and the other direction for a write cycle.

Figure 5B:
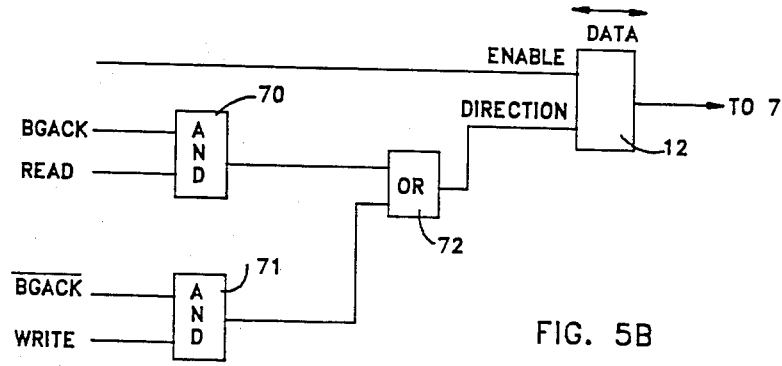

FIG. 5B illustrates the tri-state driver receiver 12 on the data bus 13 which is bidirectional. This tri-state driver is enabled or disenabled by the error detection and tri-state control system 27. It will usually be enabled except during error recovery operations since the busses are utilized both for DMA transfers and interrupt signaling. The direction of the tri-state driver receiver 12 is dependent upon a variety of conditions as shown in FIG. 5B. The presence of both a bus grant acknowledgement and a read cycle condition the AND gate 70 to gate the direction of tri-state driver receiver 12 outbound to the adapters. The presence of a not bus grant acknowledge and a not write condition, condition the AND gate 71 which, through OR gate 72, controls the same direction of the tri-state driver receiver 12 outbound to the adapters. If a write condition is present, the tri-state driver 12 will be conditioned in the opposite direction towards the processor 15 or if it is an interrupt, the bus grant acknowledge will not be present at AND gate 70 and tri-state will be conditioned in the direction of the processor 15.

Figure 5C:
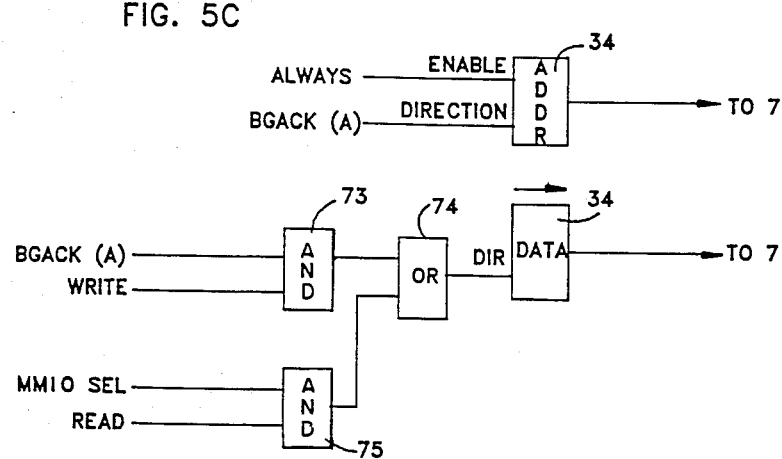

FIG. 5C illustrates the tri-state driver receivers 34 at the interfaces to the adapters 7. The address tri-state has an enable line that is always on unless a specific disable signal from the error line 36 is applied to an adapter 7 as shown in FIG. 2. The presence of the enable signal at the tri-state driver receiver 34 on the address bus, together with the bus grant acknowledge will condition the tri-state 34 and address bus in the direction of from the processor 15 to the adapter 7.

For the data bus tri-state driver receiver 34, the presence of a bus grant acknowledge and a write condition condition AND gate 33 to control the direction from the adapter 7. An alternative is an MMIO selection together with a read condition at AND gate 75 which, through OR gate 74 controls the same direction of flow from the adapter 7. If the bus grant acknowledge (BGACK) is active and write indicator is active, the adapter is transferring data to the RAM. If MMIO select is active and the write indicator is not active (read), then the control unit is reading from the adapter. For instance, the control unit processor can read the adapter MC register.

Figure 5D:
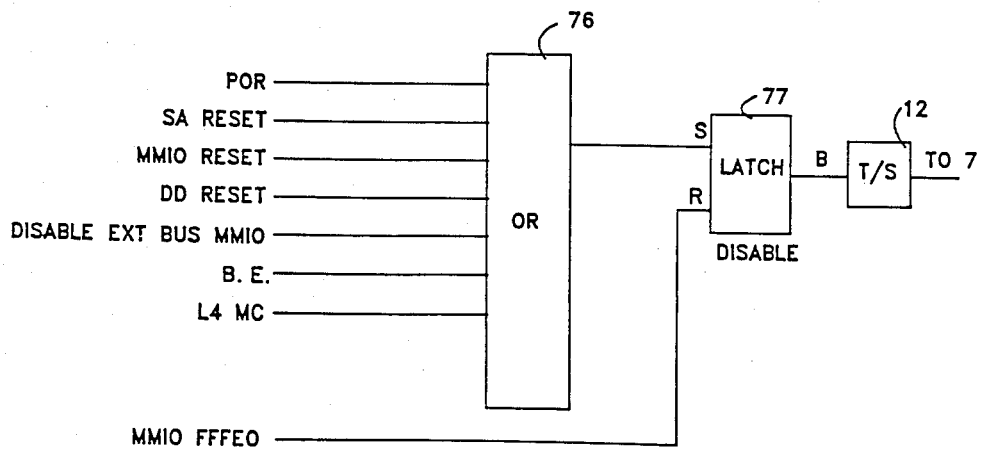

FIG. 5D illustrates the final piece of logic for the tri-state driver receiver 12 on the address and data bus. A variety of input conditions to an OR gate 76 control setting of a disabling latch 77 to decondition the tri-state 12 attached to the address bus. These conditions are shown as connected to the OR gate 76 and include a power on reset, a service adapter reset, an MMIO commanded reset, a disk dump reset, a disable the external bus MMIO command, a bus error or a level 4 machine check. Any of these will disable the latch 77 which turns off (disables) the T/S driver receiver 12 on the address bus and data bus.

Applicability of Invention

It may be observed from the foregoing description that an extremely flexible, scannerless message concentrator and communications multiplexer results from the multiprocessor bus sharing arrangement as described. The usage of an arbitrator and allowing of DMA control by the adapter processors instead of by the main control processor are significant departures in this field. These departures permit the removal of a great deal of processing workload from the main control processor 15 and allow the adapter processors to handle the interface tasks associated with protocols and formats of individual users. This freeing of the processor 15 from overhead tasks permits it to run the overall control and memory access, error control and interrupt services very efficiently. The speed of the internal DMA/MMIO data busses is such that only 2 to 3% of the available data bandwidth in terms of total throughput is utilized for adapter DMA transfers even with all of the adapters 7 operating at full speed. Thus, such a machine is instantly applicable to a complex communications environment in which numerous kinds of communicating devices and terminals are to be eventually connected for communication with a host CPU, perhaps at a remote location. The usual prior art multiplexers and communications controllers have adapted high speed scanners for the interface to the user's ports. The scanners are limited in throughput and are further limited by the fact that the control processor is faced with the tasks not only of overall control, but of multiplexing, demultiplexing, formatting and deformatting and all of the housekeeping chores that can be, in the present design, assigned to the interface adapter processors. In modern business operations, the plurality of possible users utilizing a number of different formats and protocols is significant and the ability to translate into a uniformly pure data stream for management by the control processor for transmission at one or more of the adapters in yet another protocol or format is extremely advantageous.

In light of the foregoing description, what is desired to have protected by Letters Patent and what is claimed in the claims appended hereto is given by way of general description and not of limitation, since numerous changes in specific components and control techniques can be applied as will be evident to those of skill in the art without departing from the basic principles and concepts of the architectural design as described.

Therefore, what is claimed is:

1. Error detection, isolation and recover apparatus for a multiprocessor array, comprising:
   a controlling microprocessor having a memory mapped I/O control interface, a memory containing a stored recovery routine invoked by an interrupt signal and interconnecting data and address system busses;
   a plurality of I/O microprocessors interfaced to said data and address system busses for communicating to said control microprocessor and/or said memory;
   a system memory mapped I/O control interface logic means also connected to said system data bus and address bus for receipt and exchange of signals and data;
   a plurality of individually controllable selectively actuable isolation means and a plurality of individual control signal lines connected thereto and to said system memory mapped I/O control interface logic means, said selective isolation means being interfaced between each said microprocessor and said data and address system busses;
   an error detection and control logic means connected to said individual control signal lines and means connected thereto for activating a multipoint error signal to all said microprocessors over a said individual control signal line upon detection of an error occurring while any of said microprocessors is controlling said data and address system busses;
   said error signal serving at said microprocessor which is then in control of said data and address system busses to deactivate said microprocessor and to invoke an interrupt signal to said controlling microprocessor for analyzing the cause of said error in accordance with said stored recovery routine contained in said memory.

2. Apparatus as described in claim 1, in which:
   said I/O microprocessors which are not then in control of said busses are not deactivated.

3. Apparatus as described in claim 1 and further comprising:
   a machine check register and a bus master register in said controlling microprocessor for indicating the identity of the present bus controlling processor when said error occurred and for indicating the status of the machine operation at the time said error occurred.

4. Apparatus as described in claim 1 in which:
   said interrupt signal invokes disabling of said isolation means between said controlling microprocessor and said I/O microprocessors; and
   said interrupt signal also invokes two levels of interrupts at said controlling microprocessor, one of said levels being for prompt servicing of said error condition by collecting error data for later processing and the other level being for allowing the controlling processor to complete any time dependent processing which was halted by the interrupt, and to then complete the error analysis.

5. Apparatus as described in claims 1 or 2 or 3 or 4, wherein:
   said selectively actuable isolation means comprises a plurality of tri-state driver receivers interfacing each of said microprocessors to said system address and data busses for allowing disabling any of said processors from receiving or from transmitting data in either or both directions to facilitate uninterrupted diagnosis of the source of said error.

* * * * *